United States Patent [19]

Gür et al.

[11] Patent Number: 5,364,506
[45] Date of Patent: Nov. 15, 1994

[54] METHOD AND APPARATUS FOR PARTIAL OXIDATION OF METHANE AND COGENERATION OF ELECTRICAL ENERGY

[75] Inventors: Turgut M. Gür, Santa Clara County; Henry Wise, San Mateo County, both of Calif.; Robert A. Huggins, Ulm, Germany

[73] Assignee: The Board of Trustees of the Leland Stanford Junior University, Stanford, Calif.

[21] Appl. No.: 55,231

[22] Filed: Apr. 28, 1993

[51] Int. Cl.⁵ .......................... C25B 3/02; C25B 5/00; C25B 9/00; C25B 11/04
[52] U.S. Cl. .................................. 204/59 R; 204/252; 204/265; 204/291; 429/17; 429/40; 429/218; 429/224
[58] Field of Search ............... 204/263-266, 204/291, 72, 59 R, 252; 429/40, 33, 17, 218, 224

[56] References Cited

U.S. PATENT DOCUMENTS

| | | | |
|---|---|---|---|
| 4,728,584 | 3/1988 | Isenberg | 204/265 X |
| 4,997,725 | 3/1991 | Pujare et al. | 429/40 X |
| 5,021,137 | 6/1991 | Joshi et al. | 204/265 X |
| 5,045,169 | 9/1991 | Feduska et al. | 204/265 X |
| 5,064,733 | 11/1991 | Krist et al. | 429/33 X |

Primary Examiner—Donald R. Valentine
Attorney, Agent, or Firm—Flehr, Hohbach, Test, Albritton & Herbert

[57] ABSTRACT

Disclosed is an electrochemical reactor for partially oxidizing methane and cogenerating electrical energy. A solid-state ionic reactor is described in which a solid electrolyte is provided with a cathode and a perovskite type anode having a wide range of oxygen nonstoichiometry. The cell generates electrical energy as a result of the chemical potential difference brought about by the catalytic oxidation of methane at the anode with oxygen that chemically diffuses from the cathode through the solid-state ionic conductor.

9 Claims, 2 Drawing Sheets

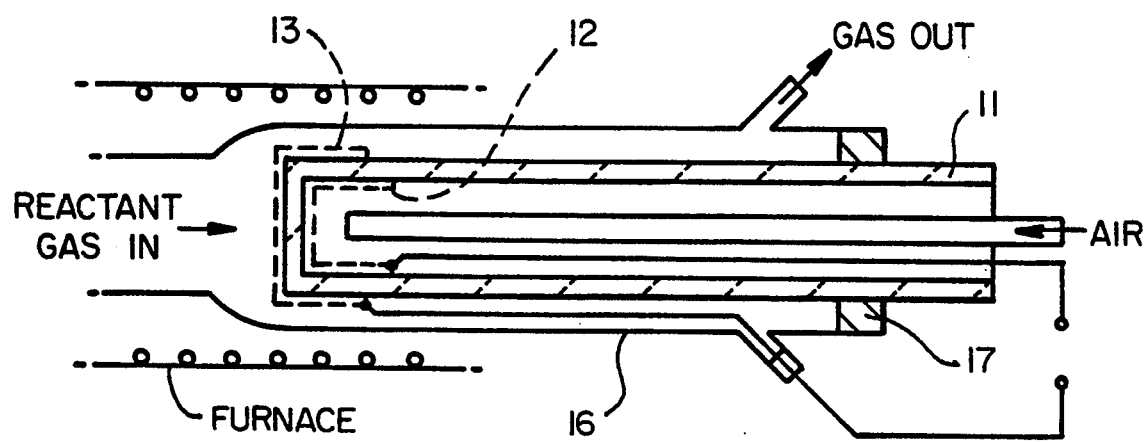
FIG_1
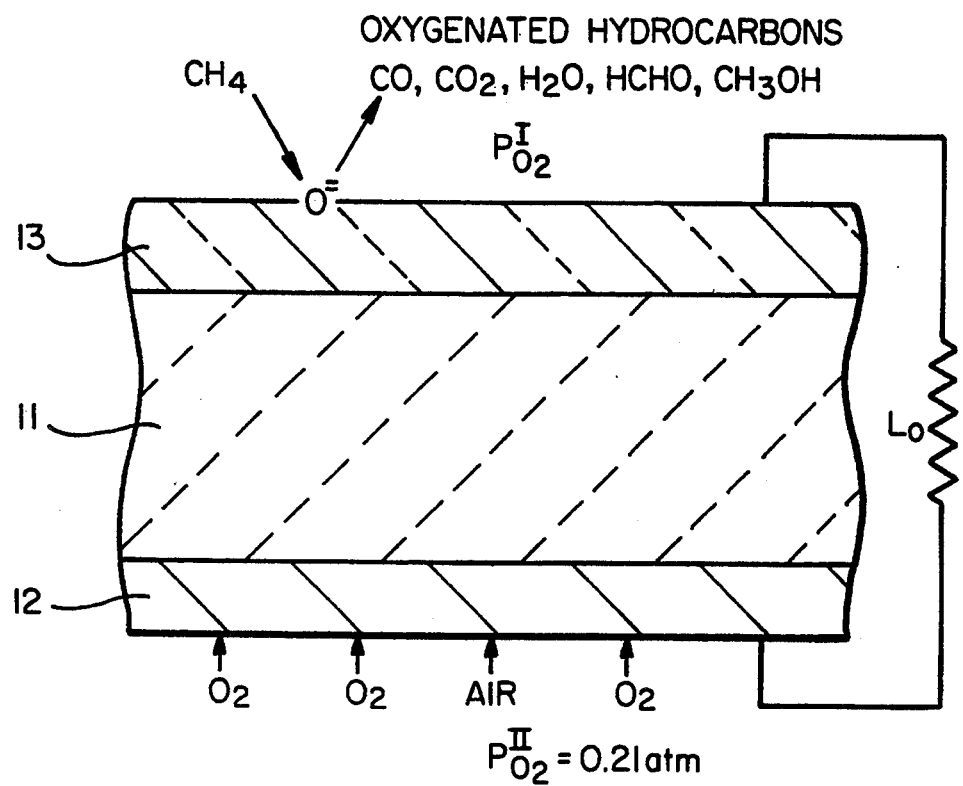
FIG_2

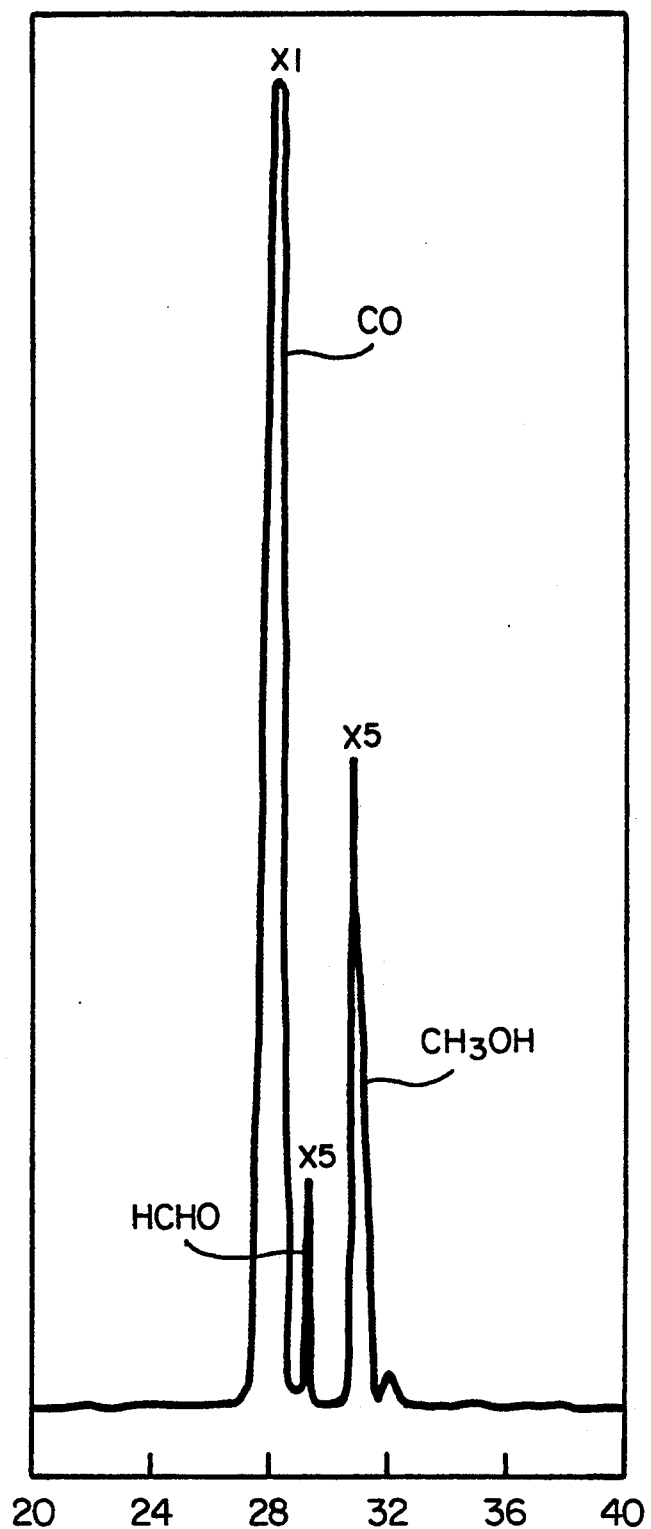
FIG_3

METHOD AND APPARATUS FOR PARTIAL OXIDATION OF METHANE AND COGENERATION OF ELECTRICAL ENERGY

BRIEF DESCRIPTION OF THE INVENTION

This invention relates generally to a method and apparatus for partial oxidation of methane and cogeneration of electrical energy, and more particularly to a reactor including a solid-state ionic electrolyte which transports oxygen ions to a perovskite catalytic anode, whereby electrical energy is generated and methane partially is oxidized to generate electrical energy.

BACKGROUND OF THE INVENTION

Natural gas which is mostly methane is an abundant and relatively inexpensive natural resource for fuel and chemical feed stock. Methane is a thermally stable molecule, and its partial oxidation is difficult because of the ease of complete oxidation of the partial oxidation products. The method of this invention makes it possible to partially oxidize methane to methanol, formaldehyde, and other useful chemical products. The availability of lattice oxygen of complex metal-oxide compounds is critical to such reactions.

In FIG. 1, there is shown a schematic diagram of a solid electrolyte cell for oxidation of methane. The cell includes a solid electrolyte member 11 with two porous film electrodes 12 and 13, deposited on the two surfaces of the solid electrolyte member 11. The electrode 12 is exposed to an oxygen-containing gas such as air or pure oxygen and serves as the cathode. The anode is in contact with a fuel; for example, methane. The cell generates an electrical potential in accordance with the Nernst equation, $$E = -\frac{RT}{4F} \ln \frac{P_{o2}^I}{P_{o2}^{II}}$$

where R is gas constant, T is temperature, F is Faraday's constant and $P_{O2}^{II}$ is the partial oxygen pressure on the cathode side (0.214 for air) and $P_{O2}^{I}$ is the partial oxygen pressure on the fuel side. The fuel is oxidized at the anode and provides the energy. An electrochemical cell of this type is described in U.S. Pat. No. 4,459,340.

Eng and Stoukides, Catal. Rev.-Sci. Eng., 33(3&4), 381 (1991) have reviewed the use of a solid electrolyte cell, such as that described above, for the cogeneration of electrical energy and useful chemicals. While noble metals have intrinsic catalytic activity for oxidation of methane, they favor complete oxidation to carbon dioxide and water.

In related research, Wise and McCarty have shown that complex oxides with perovskite structure can be used as a catalyst in the complete oxidation of methane. [Wise, H. and McCarty, J. G.; Perovskite Catalysts for Methane Combustion, Catalysis Today (1990) 231-248, Elsevier Science Publishers, B. V. Amsterdam.]

OBJECTS AND SUMMARY OF THE INVENTION

It is an object of this invention to provide a method and reactor for the efficient partial oxidation of methane to form useful chemical products and the cogeneration of electrical energy.

It is another object of this invention to provide a reactor and method for partially oxidizing methane at a perovskite electrode which is supplied with oxygen from an ion conducting electrolyte.

It is another object of this invention to provide a reactor and method for partially oxidizing methane to provide useful chemical products.

The foregoing and other objects of this invention are achieved by a solid-state ionic reactor for partially oxidizing methane to produce useful chemical products. The reactor includes a membrane made of solid stabilized zirconia electrolyte with an electron-conducting cathode on one surface and a mixed conducting anode made of a perovskite material on the other. Oxygen ions which are transported through the electrolyte to the perovskite anode diffuse to the surface of the anode and oxidize or react with the methane to partially oxidize the methane.

BRIEF DESCRIPTION OF THE DRAWINGS

The foregoing and other objects of the invention will be more clearly understood from the following description when read in connection with the accompanying drawings:

FIG. 1 is a schematic diagram showing a solid-state ionic reactor in accordance with this invention;

FIG. 2 is an enlarged view of the reaction zone of the solid-state reactor shown in FIG. 1; and FIG. 3 is a mass spectrogram showing the presence of partially oxidized useful chemical products by a reactor incorporating the invention.

DESCRIPTION OF A PREFERRED EMBODIMENT

Referring to FIG. 1, the reactor shown includes a quartz jacket 16 into which contains a concentric solid-state electrolyte tube 11 closed at one end. A suitable seal 17 provides a closure between the quartz jacket 16 and the tube 11. The interior of closed end of the solid-state electrolyte tube 11 is provided with a mixed- or electron-conducting material 12 which serves as the cathode. This electrode 12 is preferably made of a porous, electrically conductive metal or metal oxide film which allows for adsorption and transfer of oxygen from the gas phase to the solid electrolyte 11. For example, a paste containing metal particles may be painted on the surface and heated or fired to form an adherent layer or film. A mixed conducting complex oxide, such as a perovskite, may be used as a cathode material. It is not necessary that the electrode be catalytic since it is not in contact with the reactant to be oxidized. The particular metal is chosen to be stable at the operation conditions. The metal deposit on this electrode is dispersed or porous to permit the flow of oxygen to the ion-conducting electrolyte 11, where it is dissociatively ionized via the reaction $\frac{1}{2}O_2 + e \rightarrow O^=$ and conducted through the electrolyte as an oxygen ion, $O^=$.

In accordance with this invention, the catalytic electrode (anode) is formed of a perovskite material. The perovskite-type oxides used in accordance with this invention serve as viable oxidation catalysts. Some of the important considerations in this respect are (1) the range of oxygen nonstoichiometry that can be sustained by the catalyst without concomitant phase change, (2) availability of electronic defects (anion vacancies) and (3) the mobility of the oxide ions in the perovskite lattice. It is important that the catalysts serve as the oxygen source during the oxidation process. Such properties are found in $YBa_2Cu_3O_{7-\delta}$, a p-type semiconductor with high oxygen-ion mobility. This mixed conductor has an oxygen non deficient perovskite structure where the oxygen stoichiometry, δ, may vary over a range between zero and one in 1 atm of oxygen pressure at room temperature. The exceptionally wide range of oxygen nonstoichiometry and the high transport rate of oxygen make $YBa_2Cu_3O_{7-\delta}$ a potentially attractive oxidation catalyst.

The catalytic electrode may be deposited on the outer surface of the electrolyte tube using a thick film technique. Fine $YBa_2Cu_3O_{7-\delta}$ powder is dispersed in a high molecular weight organic vehicle until it reaches the consistency of paste. The paste is then brushed on the surface of the tube and fired at 850° C. for approximately one hour to form an adherent, non-porous electrode layer approximately 50 μm in thickness. It serves as the catalytic anode surface for the partial oxidation of methane. Suitable perovskite electrodes are A-site doped perovskites such as $(La_{1-x}Sr_x) MnO_{3-\delta}$ and B-site doped perovskites such as $Sr(Co_{1-x}Fe_x) O_{3-\delta}$. Other suitable perovskite catalysts are described in Perovskite Catalysts for Methane Combustion, Catalysis Today 8 (1990), 231-248, Elsevier Science Publishers, B. V. Amsterdam.

The solid electrolyte tube may be made of yttria stabilized zirconia (YSZ) tube. In one example the composition of YSZ was selected to be $(Y_2O_3)_{0.08}(ZrO_2)_{0.92}$. However, other stabilized zirconia compositions may be used; for example, zirconia stabilized with calcia. At temperatures of 500° to 1000° C., such solid solutions of zirconia ($ZrO_2$) are good conductors for oxygen ions. These compositions are examples of a class of high-conductivity solid electrolytes that have the fluorite crystal structure, which is a face-centered cubic arrangement of cations, with the oxide ions occupying the tetrahedral sites. In zirconia, for example, the tetrahedral sites are filled by oxygen ions. Vacancies at the oxygen sites give rise to rapid oxygen-ion motion at high temperatures. As with cation conductors, the disorder of the oxide ions throughout all available sites is responsible for the oxide-ion conductivity. Other oxygen-ion conducting solid electrolytes includes ceria and bismuth-oxide based materials in solid solution, such as $CeO_2$-$Y_2O_3$, $CeO_2$-$Nd_2O_3$, $Bi_2O_3$-$Y_2O_3$, and $Bi_2O_3$-$WO_3$.

The cathode 12 in one particular example was a porous platinum electrode. The electrode was formed by painting a platinum paste (Hanovia #6929) on the surface of the YSZ tube and firing the tube at about 850° C. in air for about one hour to form a porous contiguous, and adherent platinum electrode layer. The platinum electrode exposed to the ambient atmosphere serves as the reference electrode (cathode) with fixed oxygen activity. As shown, air was gently blown inside the YSZ tube through a small diameter quartz conduit onto the porous platinum surface in order to avoid possible mass transport limits.

The preferred electrochemical reactor configuration can be represented by:

(+) $CH_4$, $YBa_2Cu_3O_x$/YSZ/Pt, air (−)

The oxygen needed for the oxidation of methane is electrochemically pumped through the YSZ solid electrolyte 12 from the air side onto the $YBa_2Cu_3O_{7-\delta}$ electrode 13 in contact with methane. This process involves initially the dissociative adsorption of oxygen on the platinum electrode followed by the interaction of oxygen atoms with oxygen vacancies and electrons at the negative electrode, as represented by $$O(a) + V_o^\infty + 2e' = O_o^x$$

where O(a) is adsorbed oxygen, $V^\infty_o$ is an oxygen-ion vacancy in the YSZ electrolyte, and $O^x_o$ is an oxygen lattice site in the YSZ. The oxygen ion transport results from the potential difference, given by the Nernst equation through the YSZ electrolyte toward the $YBa_2Cu_3O_{7-\delta}$/YSZ interface. They enter the $YBa_2Cu_3O_x$ phase and chemically diffuse to its outer surface under the chemical potential gradient. The $YBa_2Cu_3O_{7-\delta}$/YSZ interface is sustained at a high oxygen activity by the electrical potential such that a steep chemical potential gradient for oxygen across the thickness of the $YBa_2Cu_3O_{7-\delta}$ layer is maintained so that it readily supplies by chemical diffusion the oxygen used in the partial oxidation reaction.

Schematically, the anodic partial oxidation reaction can be represented by $$CH_{4(g)} + O_{s(YCBO)} = \rightarrow (CO, CO_2, CH_3OH, HCHO, etc.) + H_2O + 2e'$$

where $O_s$ = denotes lattice oxygen at the surface and YCBO denotes $YBa_2Cu_3O_{7-\delta}$.

In one example, $CH_4$ and He gas mixtures were circulated past the anode connected through the load $L_o$, FIG. 1. The reactor was operated at 740° C. FIG. 3 shows the mass spectroscopic analysis of the gas mixture after 17 minutes of operation. Among the products of interest, one finds carbon monoxide (28 amu), formaldehyde (29 amu), methanol (31 amu). Also, carbon dioxide and water were formed.

The above discussion has focused on the partial oxidation of methane. However, it is apparent that the system can be operated to cogenerate electrical energy, which is schematically illustrated in FIG. 2 as current flowing through the load $L_o$.

Thus, methane undergoes partial oxidization on ($YBa_2Cu_3O_{7-\delta}$) catalytic electrodes in a sold state electrochemical reactor supported by a stabilized zirconia solid electrolyte. The solid electrolyte was used to electrochemically supply the oxygen necessary for the oxidation reaction. Lattice oxygen actively participated in the oxidation reaction. Thus, there has been provided a solid-state ionic reactor and method which partially oxidizes methane and cogenerates electrical energy.

What is claimed:

1. A solid-state ionic reactor for partially oxidizing methane to produce useful chemical products comprising
   a stabilized zirconia solid electrolyte,
   a cathode formed on one surface of said electrolyte adapted to be in contact with an oxygen ion source, and
   a perovskite type anode serving as a methane oxidizing catalyst formed on the other surface of said electrolyte with its outer surface adopted to be in contact with the methane whereby the oxygen ions formed at said cathode are transported through said electrolyte to the perovskite interface where they are incorporated in the perovskite anode and chemically diffuse to the outer surface to partially oxidize the methane in contact therewith.

2. An electrochemical reactor for partially oxidizing methane to produce chemical products and electrical energy, comprising
   a oxygen ion conducting solid electrolyte, a cathode formed on one surface of said electrolyte adapted to be in contact with an oxygen source for reacting therewith to form oxygen ions, and a catalytic perovskite-type anode having a wide range of oxygen stoichiometry formed on the opposite surface of said solid electrode with its outer surface in direct contact with the methane, said anode receiving oxygen ions conducted through the electrolyte and supplying oxygen at its outer surface for the partial oxidation of methane at the anode.

3. The electrochemical reactor as in claims 1 or 2 including means for extracting electrical energy generated by said reactor.

4. The method of simultaneously generating electrical energy and partially oxidizing methane to produce chemical products in a reactor cell having a first cathode electrode and a second perovskite-type catalytic anode electrode having wide oxygen nonstoichiometry in electrical contact with an oxygen ion conducting solid electrolyte, the steps of contacting said first electrode with a source of oxygen to form oxygen ions which are conducted from the first electrode to the second electrode to generate an electrical potential, chemically diffusing oxygen formed at the interface between the oxygen ion conducting electrode and the perovskite electrode through the perovskite electrode, and contacting said second electrode with methane to thereby partially oxidize said methane and produce chemicals.

5. The method of claim 4 including connecting an electrical load between said electrodes to extract electrical energy.

6. An electrochemical reactor for partially oxidizing methane to produce chemical products and electrical energy, comprising a oxygen ion conducting solid electrolyte, a cathode formed on one surface of said electrolyte adapted to be in contact with an oxygen source for reacting therewith to form oxygen ions, and a catalytic perovskite $YBa_2Cu_3O_{7-\delta}$ anode having a wide range of oxygen stoichiometry formed on the opposite surface of said solid electrode for receiving oxygen ions conducted through the electrolyte and supplying oxygen for the partial oxidation of methane at the anode.

7. An electrochemical reactor for partially oxidizing methane to produce chemical products and electrical energy, comprising a oxygen ion conducting solid electrolyte, a cathode formed on one surface of said electrolyte adapted to be in contact with an oxygen source for reacting therewith to form oxygen ions, and a catalytic perovskite $(La_{1-x}Sr_x) MnO_{3-\delta}$ anode having a wide range of oxygen stoichiometry formed on the opposite surface of said solid electrode for receiving oxygen ions conducted through the electrolyte and supplying oxygen for the partial oxidation of methane at the anode.

8. An electrochemical reactor for partially oxidizing methane to produce chemical products and electrical energy, comprising a oxygen ion conducting solid electrolyte, a cathode formed on one surface of said electrolyte adapted to be in contact with an oxygen source for reacting therewith to form oxygen ions, and a catalytic perovskite $Sr(Co_{1-x}Fe_x) O_{3-\delta}$ anode having a wide range of oxygen stoichiometry formed on the opposite surface of said solid electrode for receiving oxygen ions conducted through the electrolyte and supplying oxygen for the partial oxidation of methane at the anode.

9. An electrochemical reactor as in claims 6, 7 or 8 including means for extracting electrical energy generated by said reactor.

* * * * *